US 6,541,937 B2

(12) United States Patent
Kato

(10) Patent No.: US 6,541,937 B2
(45) Date of Patent: Apr. 1, 2003

(54) MOTOR CONTROL DEVICE WITH VECTOR CONTROL FUNCTION

(75) Inventor: Yoshihito Kato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 09/952,027

(22) Filed: Sep. 14, 2001

(65) Prior Publication Data
US 2002/0030465 A1 Mar. 14, 2002

(30) Foreign Application Priority Data
Sep. 14, 2000 (JP) ........................................ 2000-280865

(51) Int. Cl.[7] ................................................ H02P 7/36
(52) U.S. Cl. ...................... 318/727; 318/632; 318/798; 318/799
(58) Field of Search ................................ 318/611, 632, 318/798, 799, 806, 807, 812, 727

(56) References Cited

U.S. PATENT DOCUMENTS 5,448,150 A * 9/1995 Yamamoto et al. ......... 318/805
6,184,648 B1 * 2/2001 Kato et al. .................. 318/811
6,300,741 B1 * 10/2001 Okuyama .................... 318/799

FOREIGN PATENT DOCUMENTS

JP 7-46874 2/1995
JP 9-239418 9/1997

* cited by examiner

Primary Examiner—Robert E. Nappi
Assistant Examiner—Rina I. Duda
(74) Attorney, Agent, or Firm—Foley & Lardner

(57) ABSTRACT

When the amount L of actual load change that is picked up from an external plant control device exceeds a reference level L* of load change amount per prescribed unit time that is pre-set to serve as an impact drop detection level, the d axis field current Id is suppressed to a prescribed limiting amount. The d axis voltage reference Vd* and hence the motor and armature voltage Eac are thereby suppressed exclusively during a prescribed field limiting period Td. A large potential difference (voltage margin) is thereby generated between the converter output voltage Vac and AC motor armature voltage Eac, thereby speeding up the rise of output current of the motor. Subsequent recovery of the motor speed after impact drop is speeded up by returning the voltage level to the original d axis voltage reference Vd*.

7 Claims, 9 Drawing Sheets

When the secondary flux reference φ2* becomes small, the d axis field current component Id* also becomes small

MOTOR CONTROL DEVICE WITH VECTOR CONTROL FUNCTION

CROSS-REFERENCE TO RELATED APPLICATION

This application claims benefit of priority to Japanese Patent Application No. JP 2000-280865 filed Sep. 14, 2000, the entire content of which is incorporated by reference herein.

BACKGROUND OF THE INVENTION

1. Field of the Invention

The present invention relates to a power conversion device that drives a motor and more particularly relates to a motor control device with a vector control function provided with the function of compensating for a deceleration condition produced by abrupt change of load.

2. Description of the Related Art

A typical layout of a motor control device of the voltage inverter source is shown in FIG. 1. The motor control device shown in FIG. 1 is of the vector control type having speed feedback and current feedback control whereby an input speed reference signal ωr* is subjected to feedback calculation with a speed feedback signal ω' calculated by a speed sensor 1, primary flux angle calculator 2 and differentiator 3, and the result of the calculation is converted to a torque reference signal Tr* by the speed regulator (ASPR= Automatic Speed Regulator) 4, and the q axis torque current reference signal Iq* is calculated by dividing this value by the secondary flux reference Φ2*. Also, the d axis current reference signal Id* is calculated by a field weakening regulator (AFWR=Automatic Field Weakening Regulator) 5 and a flux saturation pattern setter 6, from the speed feedback signal ω'. The respective final current reference signals Id, Iq are generated by feedback calculation in respect of these current reference signals Id* and Iq* with the d axis and q axis current feedback (F. B.) signals Id', Iq', and are output as respective voltage references Vd*, Vq* by respective current regulators (ACR=Automatic Current Regulator) 7, 8 of the d axis and q axis. Based on these voltage references Vd*, Vq*, power converter 10 then converts the DC voltage Vdc that is supplied from the DC power source to the desired AC voltage Vac by means of element gate firing (ignition) pulse instructions from 2-3 axis co-ordinate/ PWM converter 9 and outputs this, thereby driving motor (IM=Induction Motor) 11 by supplying the desired current thereto.

In this construction, in the d axis field current Id, which is the field component of the motor in vector control, the secondary flux reference Φ2* is calculated in accordance with the speed feedback signal ω', in accordance with a single field pattern in the field weakening regulator 5. This field pattern is set as a fixed value determined for each individual motors connected to the current control device. When a speed feedback signal ω' of a certain magnitude is input, the d axis field current Id of the motor is thereby calculated in accordance with the field pattern. Also, the slippage angle θs is calculated based on the primary flux angle θr calculated by the primary flux angle calculator 2 and the q axis torque current Iq that supplies the torque required by the motor and the secondary flux angle θo required by the motor is found by adding the primary flux angle θr, which is the flux angle of the actual motor. Motor 11 can thus be driven by supplying any desired voltage to motor 11 by using these to effect conversion from the d-q axis components to the three-phase AC output components.

In a conventional motor control device as described above, even if the speed reference ωr* is fixed, when there is abrupt variation (change) of the load such as for example on biting (threading) into rolling mill material, as shown in FIG. 2, a drop occurs in the motor speed (called "impact drop"); Accordingly, a q axis torque current Iq was added such as to convert the motor speed which had thus dropped to the target speed prior to impact drop while concurrently motor accelerating torque was applied to motor 11 by calculating the secondary flux angle θo taking into account slip angle (slippage angle, θs and the respective voltage references Vd* and Vq*, by means of d axis and q axis current regulators 7 and 8. In this process, there was a lag on the rise of the torque, due to restrictions an the output range of the output voltage of the control device (converter). Thus, in a conventional motor control device, a considerable time was required to recover the drop in motor speed produced by occurrence of impact drop.

Such a drop in motor speed produced by impact drop is disadvantageous both from the point of view of product quality maintenance and economically in rolling plants and there was a strong demand for improvement of motors in respect of such impact drop.

SUMMARY OF THE INVENTION

Accordingly, one object of the present invention is to provide a novel motor control device with a vector control function capable of recovering rapidly drop in motor speed produced by impact drop, by improving the rise of motor current when impact drop occurs produced by a steep change in load.

The foregoing objective is achieved by a motor control device with a vector control function having the following construction.

Specifically, according to the invention, a motor control device with a vector control function that inputs a speed reference signal from an external plant control device and that outputs a desired AC voltage and frequency in accordance with this speed reference signal comprises: load condition evaluation means (unit) that identifies the load condition of the motor from load information input from said external plant control device; d axis field current limiting means (unit) that limits the d axis field current Id to a certain limiting amount when the load condition evaluation means (unit) identifies that the load change is steep; and d axis field torque compensation means (unit) that compensates insufficiency of the motor torque produced by suppression of the d axis field current Id by said d axis field current limiting means (unit) by increasing the q axis torque current Iq.

With a motor control device with vector control function according to the invention, when the amount L of actual load change that is picked up from an external plant control device exceeds a reference level L* of load change amount per prescribed unit time (per dozens of mm seconds) that is pre-set to serve as an impact drop detection level, the d axis field current Id is suppressed to a prescribed limiting amount. The d axis voltage reference Vd* and hence the motor and armature voltage Eac of the motor are thereby suppressed exclusively during a prescribed field limiting period Td. A large potential difference (voltage margin) is thereby generated between the converter output voltage Vac and armature voltage Eac of AC motor, thereby speeding up the rise of output current of the motor. Subsequent recovery of the motor speed after impact drop can be speeded up by returning the voltage level to the original d axis voltage reference Vd*.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
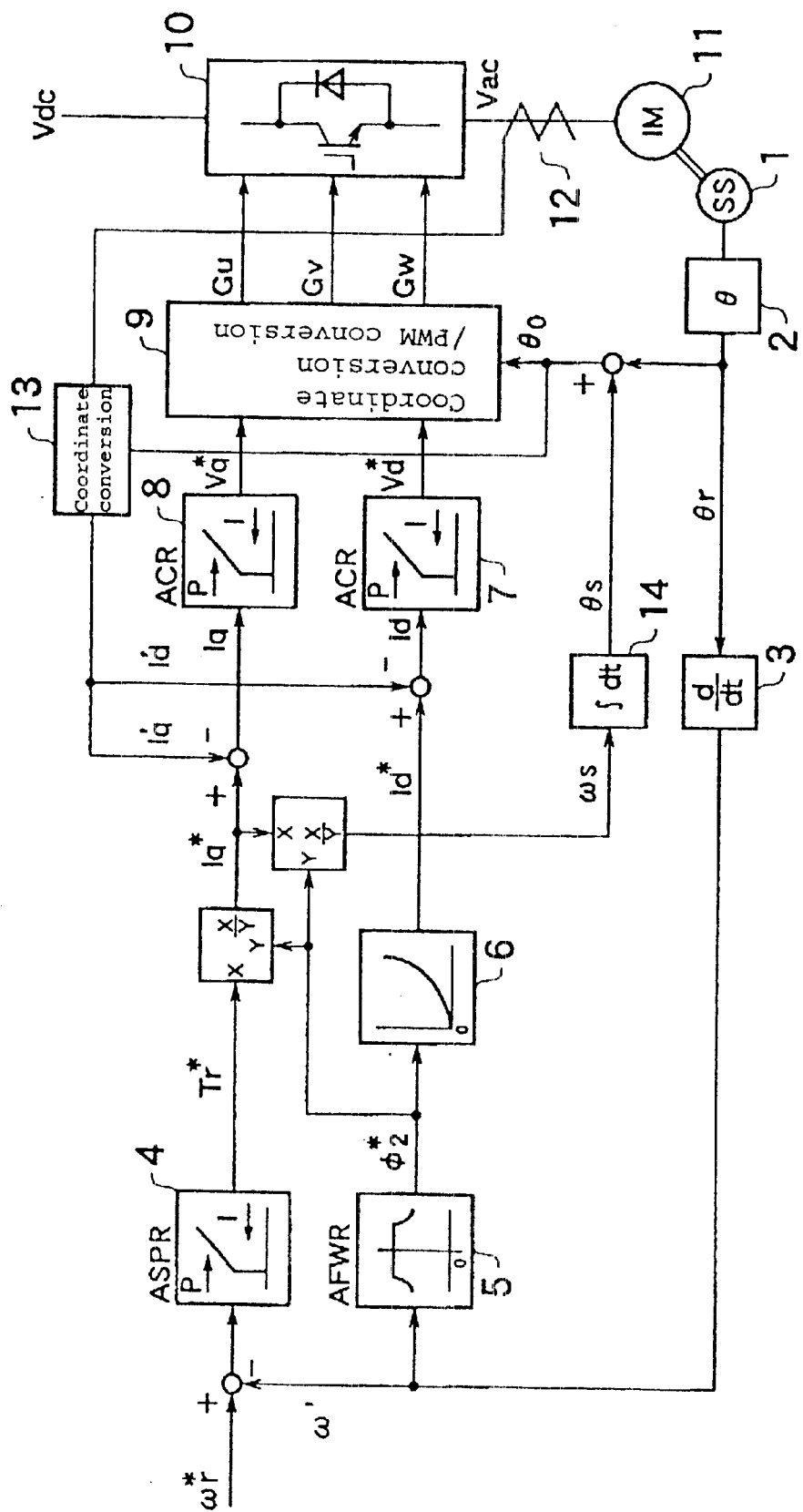
FIG. 1 is a block diagram of a prior art motor control device.
Figure 2:
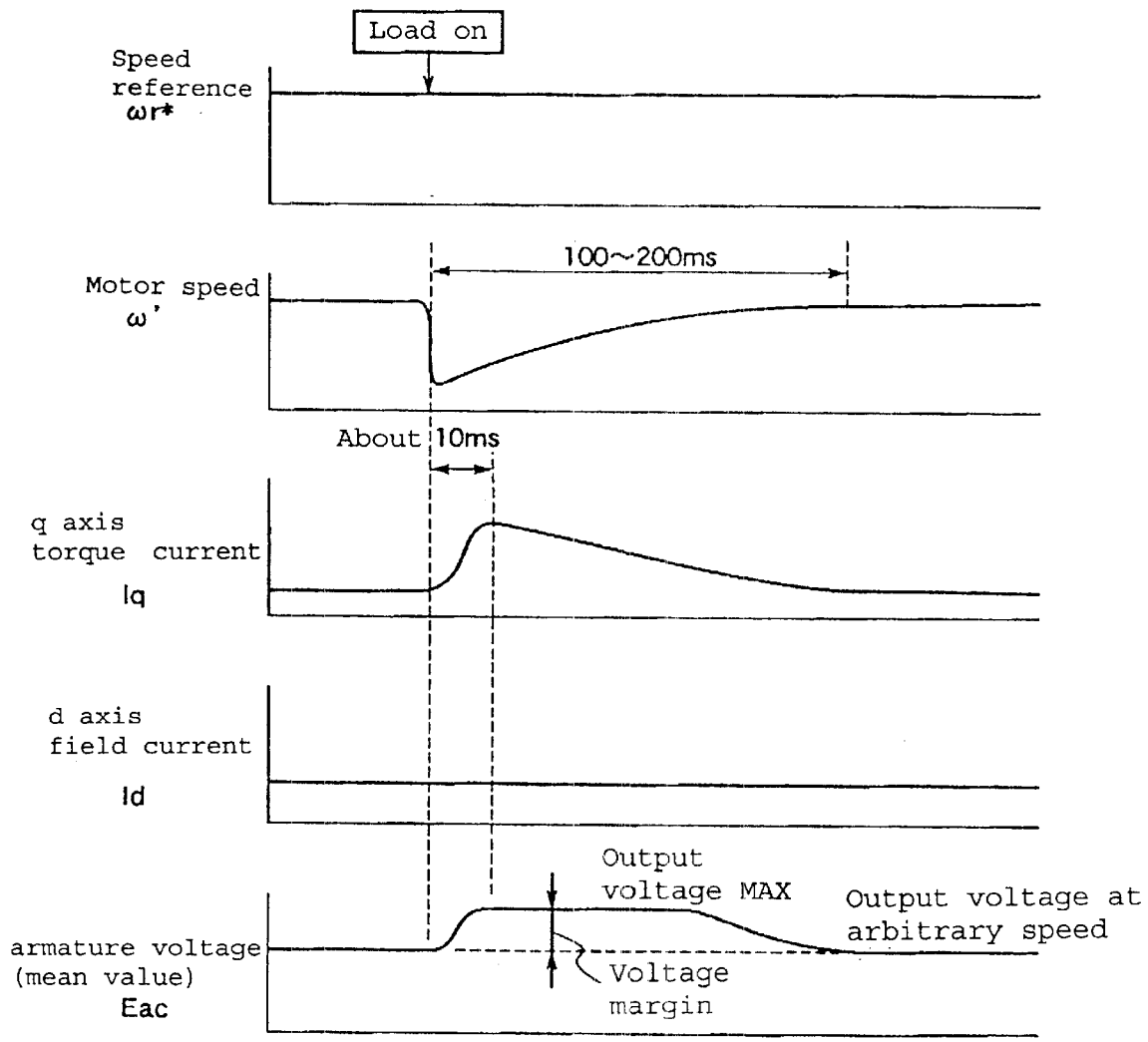
FIG. 2 is a graph illustrating the relationship among speed reference, motor speed, q axis torque current feedback, d axis field current feedback, and motor armature voltage on occurrence of impact drop in a prior art motor control device.

Referring now to the drawings, wherein like reference numerals designate identical or corresponding parts throughout the several views, and more particularly to FIG. 3 thereof, one embodiment of the present invention will be described.

Figure 3:
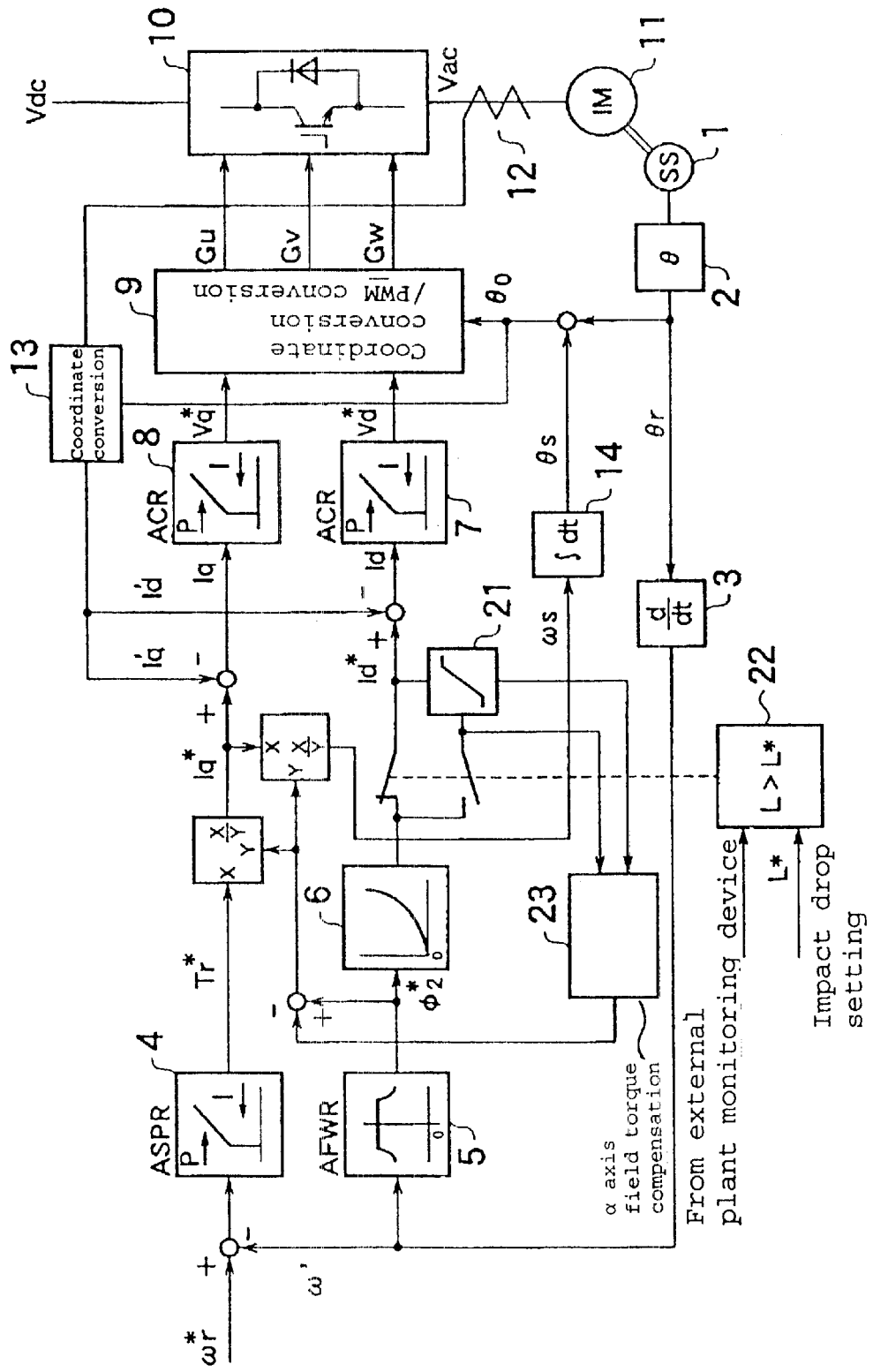
FIG. 3 is a block diagram of a motor control device according to a first embodiment of the present invention.

FIG. 3 is a block diagram of a motor control device according to a first embodiment of the present invention. The motor control device shown in this Figure comprises: a speed regulator (ASPR) 4 that performs feedback calculation of flux feedback signal ω' calculated by primary flux calculator 2 and differentiator 3 with the speed reference signal ωr that is input from an upper-layer external plant control device, and that converts the speed reference signal into a torque reference signal Tr*; a field weakening regulator (AFWR) 5 that further converts the speed feedback signal ω' to secondary flux reference Φ2*; a flux saturation pattern setter 6 that converts the secondary flux reference Φ2* from field weakening regulator 5 to d axis field current reference signal Id*; current regulator (ACR) 7 that converts the feedback calculation result of the d axis field current reference signal Id* from flux saturation pattern setter 6 and the d axis current feedback (F. B.) signal Id' into the d axis voltage reference signal Vd*; and a current regulator (ACR) 8 that converts the feedback calculation result of the q axis torque current reference signal Iq* and q axis current feedback (F. B) signal Iq' obtained by dividing the torque reference signal Tr* from the speed regulator (ASPR) 4 by the secondary flux reference Φ2* from the field weakening regulator (AFWR) 5 to a q axis voltage reference signal Vq*.

The motor control device according to this embodiment further comprises: a 2-3 axis/PWM converter 9 that generates a PWM (pulse width modulation) signal by 2-3 axis conversion from the two d axis and q axis voltage reference signals Vd* and Vq*; a power converter 10 that drives motor (IM) 11 by supplying it with the desired current by converting the PWM signal from this 2-3 axis/PWM converter 9 into AC voltage for driving the motor; a speed sensor (SS=speed sensor) 1 that detects the speed of rotation of motor 11; a current sensor 12 that detects the current flowing in motor 11; a current feedback coordinate converter 13 that subjects the current feedback signal detected from this current sensor (CT) 12 to 3-2 axis and d-q axis conversion to produce d axis feedback current Id' and q axis feedback current Iq in vector control; and a slip (slippage) integrator 14 that integrates the slippage ωs by calculating the slip (slippage) ωs from the secondary flux reference Φ2* from the field weakening regulator 5 and the q axis torque current reference signal Iq*.

The motor control device according to this embodiment further comprises: a d axis field current limiter 21 that limits the d axis field current Id calculated by feedback calculation of d axis feedback current Id' with the d axis field current reference Id* that is output from flux saturation pattern setter 6; load condition evaluator 22 that detects the load condition from the output of a load relay of an external plant monitoring device; and a d axis field torque compensator 23 that compensates the amount of suppression of the d axis field current with respect to the q axis torque current Iq by subtracting the secondary flux reference Φ2*, so that the motor torque itself is not suppressed. It should be noted that, of these structural elements of the motor control device, the other structural elements apart from d axis current limiter 21, load condition evaluator 22 and d axis field torque compensator 23 are the same as the structural elements of the prior art motor control device shown in FIG. 8.

A selection is made by load condition evaluator 22 such that the d axis field current Id is passed through d axis field current limiter 21 when the actual amount of load change L picked up from an external plant control device exceeds the reference level, with respect to an arbitrary load change amount reference level L* per unit time set beforehand as the impact drop detection level.

Figure 4:
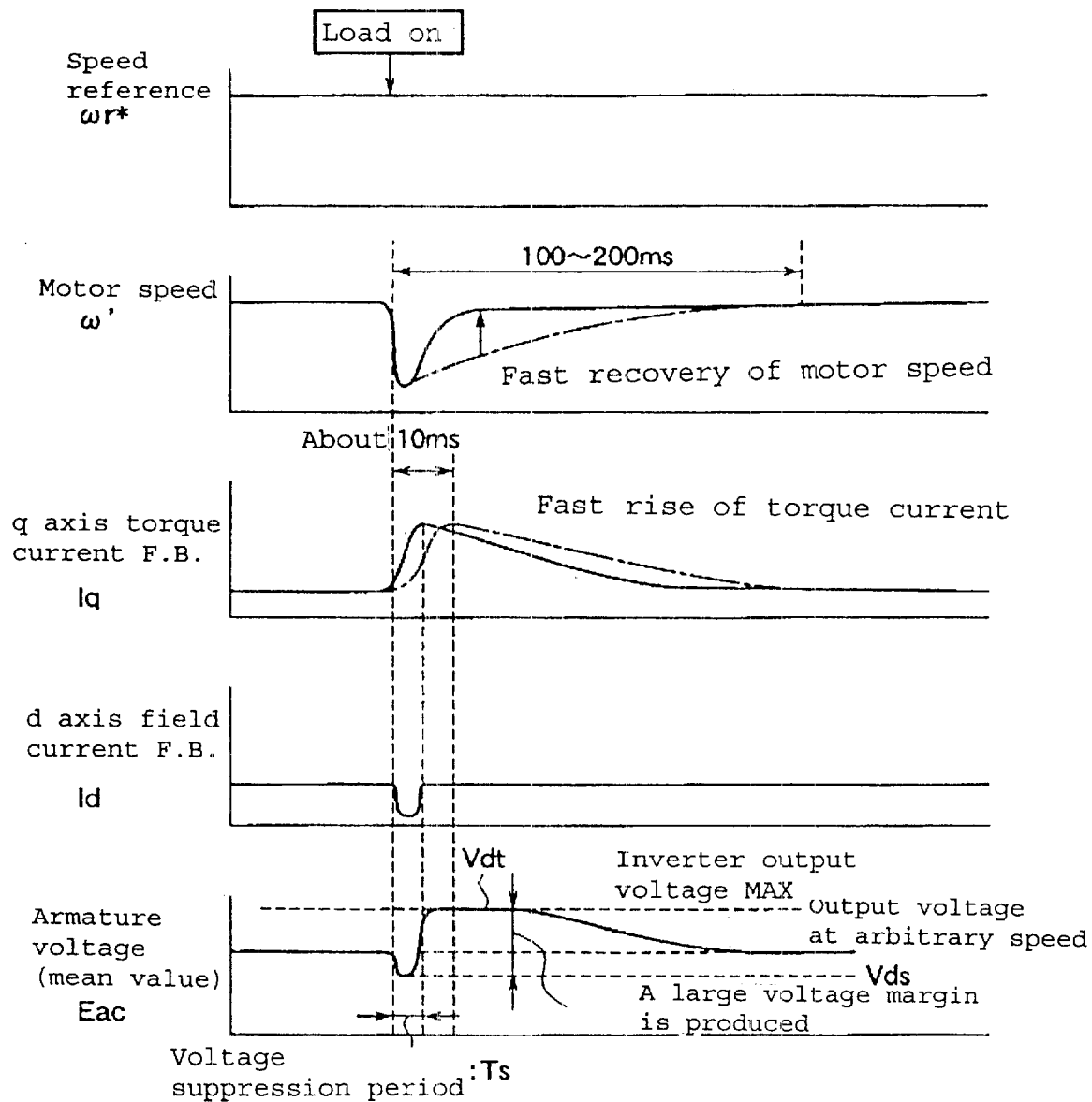
FIG. 4 is a graph illustrating the relationship among speed reference, motor speed, q axis torque current feedback, d axis field current feedback, and motor armature voltage on occurrence of impact drop in the above embodiment.

By being passed through the d axis field current limiter 21, the d axis voltage reference Vd*, and hence the output AC voltage Vac, can be suppressed by suppressing d axis field current Id greater than the magnitude originally determined for the individual motor, in the field limiting period Ts, as shown in FIG. 4. After this field limiting period Ts, by returning to the d axis field current reference Id* determined by the original field pattern, the d axis voltage reference Vd* and hence the armature voltage Eac can be made to change from the field limiting period voltage Vds to the original armature voltage Vdt (at this point, the control device delivers an output up to the limit of the output voltage, in order to achieve recovery of speed). The provision of a voltage margin by producing potential difference between this converter output and motor 11 is associated with increase in the magnitude of di/dt of the motor current, that is to say, improvement in the rise thereof and so makes possible rapid recovery of a drop in motor speed on impact drop. In this case, since the extent of the insufficiency of the motor torque is compensated by suppressing the secondary flux reference Φ2* or d axis field current Id, the q axis torque current Iq is compensated in the increasing direction through d axis field torque compensator 23.

In this way, in the first embodiment of the present invention, in the event of occurrence of impact drop due to steep load change, the armature voltage Eac generated in the AC motor 11 is suppressed by suppressing the d axis field current Id only in the period Ts, as shown in FIG. 4. In this process, compensation of the motor torque produced by suppressing the d axis field current Id is achieved by decreasing the secondary flux reference $\Phi 2^*$ and increasing the q axis torque current Iq. This period of field suppression Ts is a period much shorter than recovery of motor speed on impact drop. A large voltage margin is maintained by creating a potential difference in the converter output voltage and motor voltage by changing the motor voltage from the field suppression period output voltage Vds to the original output voltage Vdt as shown in FIG. 4 by returning the d axis field current Id to the original value determined by the field weakening regulator 5 and flux saturation pattern setter 6 after this field suppression period Ts. In this way, rapid recovery of drop in the motor speed on impact drop can be achieved by improving the rise in the motor current.

Figure 5A:
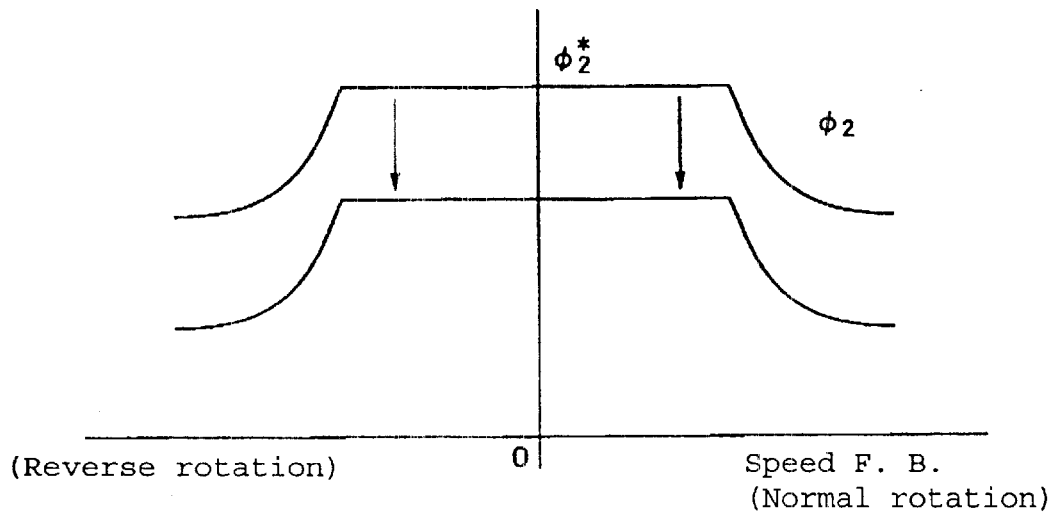
FIGS. 5A and 5B are graphs illustrating the relationship of field weakening pattern and d axis field current in the foregoing embodiment.
Figure 5B:
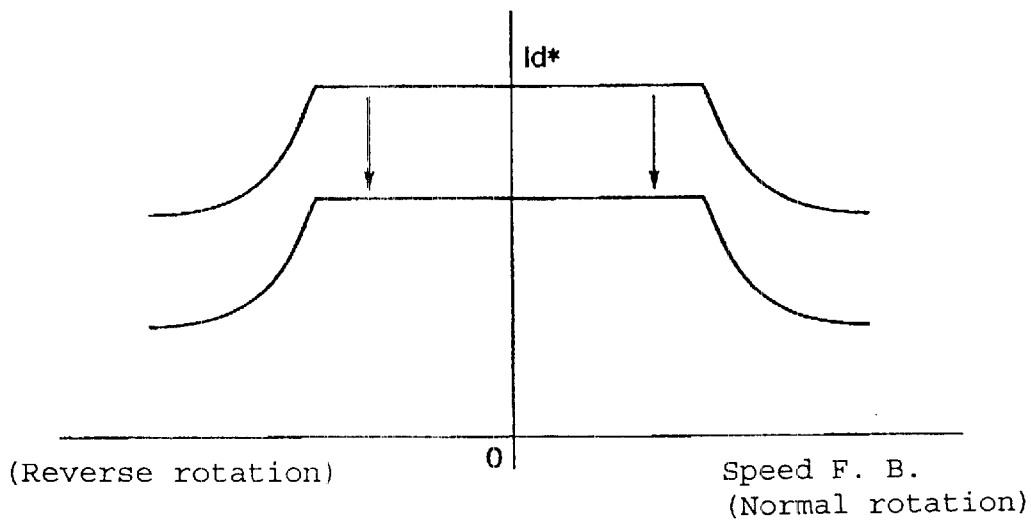
Figure 6:
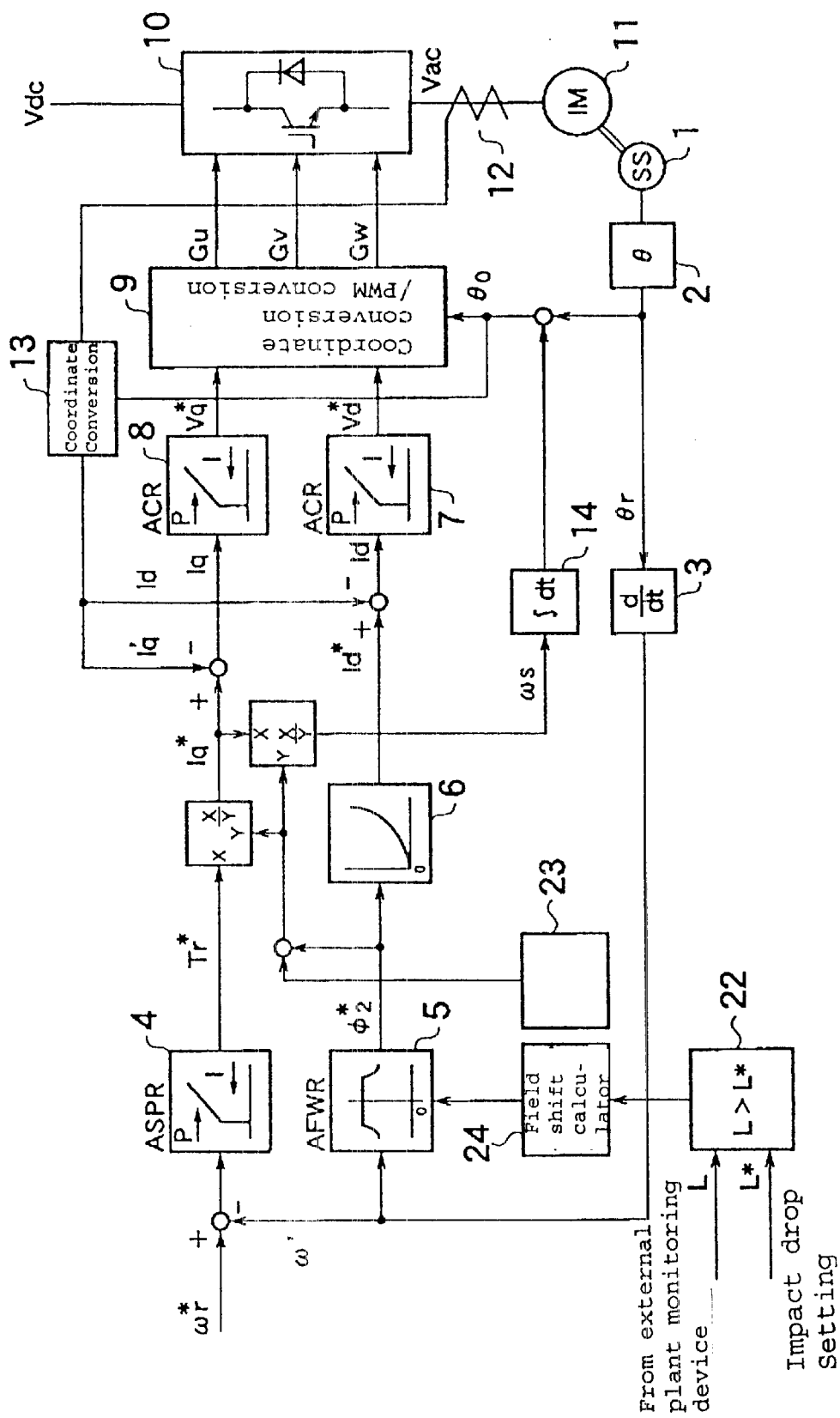
FIG. 6 is a block diagram of a motor control device according to a second embodiment of the present invention.

Next, a motor control device according to a second embodiment of present invention will be described with reference to FIG. 5 and FIG. 6. In this second embodiment, a field shift calculator 24 is added to the motor of the first embodiment shown in FIG. 3. That is to say, when a steep change of load is detected by load condition evaluator 22, the secondary flux reference $\Phi 2^*$ is reduced and the d axis field current Id is suppressed to a low value by making the field shift calculator 24 shift the entire field weakening pattern produced by the field weakening regulator 5 from speed feedback signal $\omega'$ in respect of d axis field current Id to "low" in a certain field suppression period Ts. In this case also, the q axis torque current Iq is compensated in the increasing direction through d axis field torque compensator 23 in order to compensate for the insufficiency of the motor torque resulting from suppression of the secondary flux reference $\Phi 2^*$ or d axis field current Id.

In this way, the armature voltage Eac can be suppressed to a low value by a prescribed amount for a certain desired field suppression period Ts, thereby conferring a voltage change range (voltage margin); this makes it possible to improve the current rise and so enables rapid recovery of the motor speed after impact drop.

Figure 7:
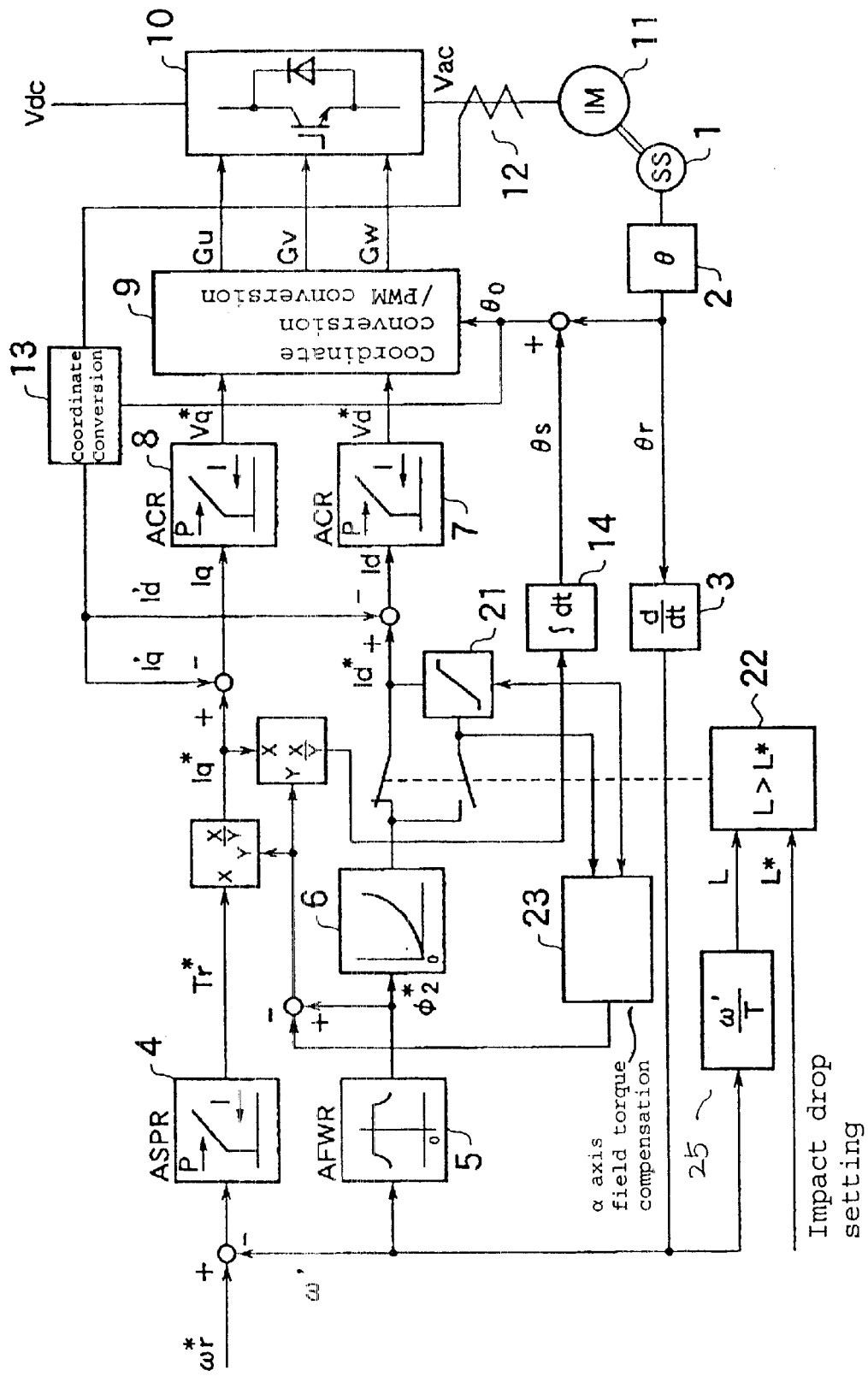
FIG. 7 is a block diagram of a motor control device according to a third embodiment of the present invention.

Next, a motor control device according to a third embodiment of the present invention will be described with reference to FIG. 7. The third embodiment is constructed as shown in FIG. 7; in particular, it has the feature that load condition evaluator 22 is arranged to evaluate the load condition using the speed feedback signal $\omega'$ and speed converter 25 is added to the motor control device of the first embodiment shown in FIG. 3.

In this third embodiment, speed converter 25 converts the speed feedback signal $\omega'$ to a speed change amount (=L) in a certain unit time; if this speed change amount L is larger than a change amount reference level L* set beforehand as an impact drop detection level, load condition evaluator 22 decides that impact drop has occurred and consequently executes armature voltage suppression, exclusively in the field suppression period Ts, thereby producing a rapid recovery from impact drop by expanding the voltage margin of the armature voltage Eac.

Figure 8:
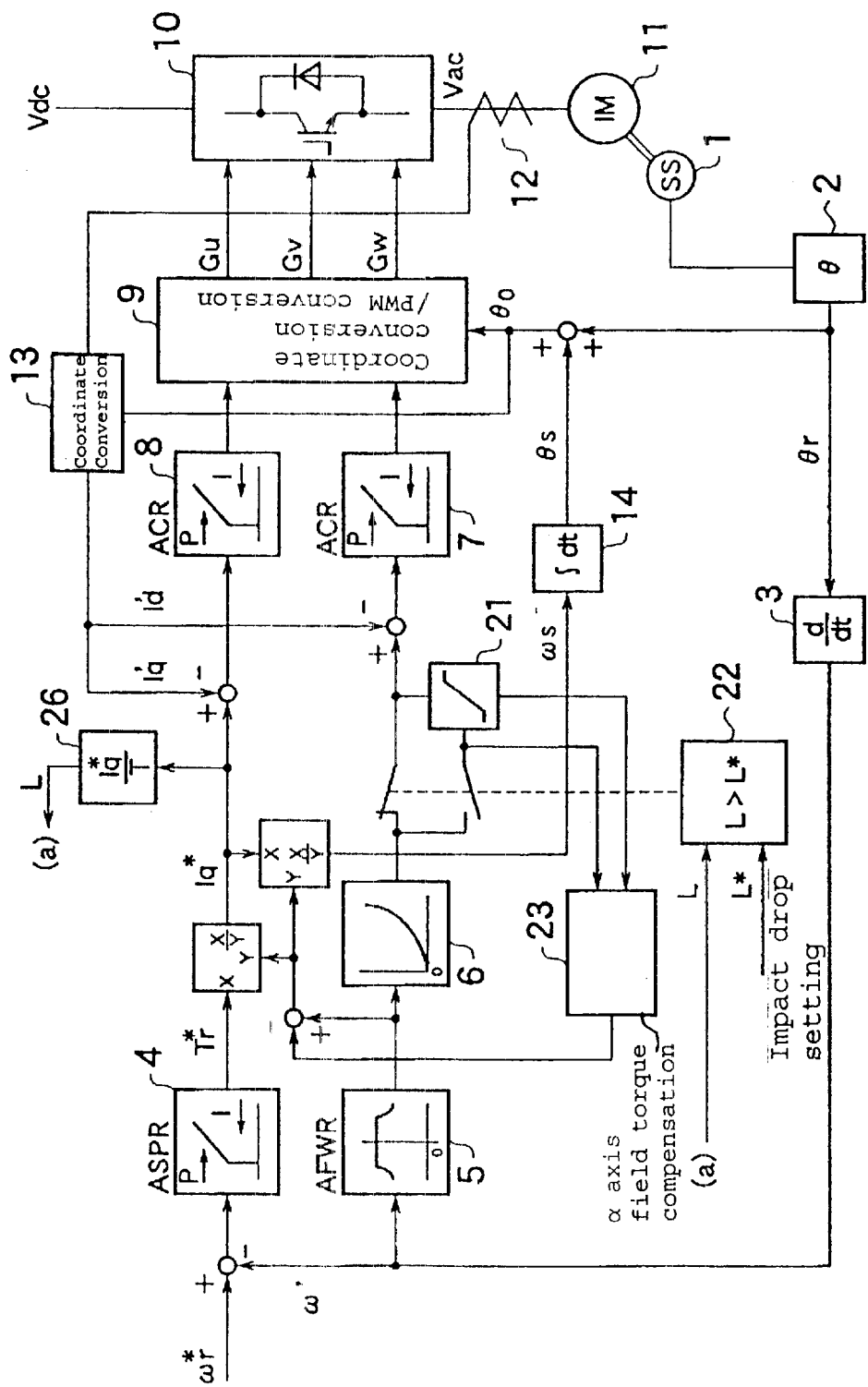
FIG. 8 is a block diagram of a motor control device according to a fourth embodiment of the present invention.

Next, a motor control device according to a fourth embodiment of the present invention described with reference to FIG. 8. The characteristic feature of the fourth embodiment is that a q axis torque current change amount calculator 26 that calculates the amount of change L of the q axis torque current Iq* per unit time is provided; regarding the q axis torque current change amount reference level L* per unit time, which is set beforehand as the impact drop detection level within load condition evaluator 22, if the q axis torque current change amount L calculated by q axis torque current change amount calculator 26 exceeds the reference level L*, impact drop is deemed to have occurred.

In the fourth embodiment, load condition evaluator 22 concludes that impact drop has occurred if the q axis torque current change amount L calculated by q axis torque current change amount calculator 26 has exceeded the q axis torque current change amount reference level L* per unit time set beforehand as impact drop detection level and makes a selection such that the d axis field current Id is passed through the d axis field current limiter 21, so that output voltage suppression is executed exclusively in field suppression period Ts; recovery from impact drop is thus speeded up thanks to the armature voltage margin which is thereby obtained.

Figure 9:
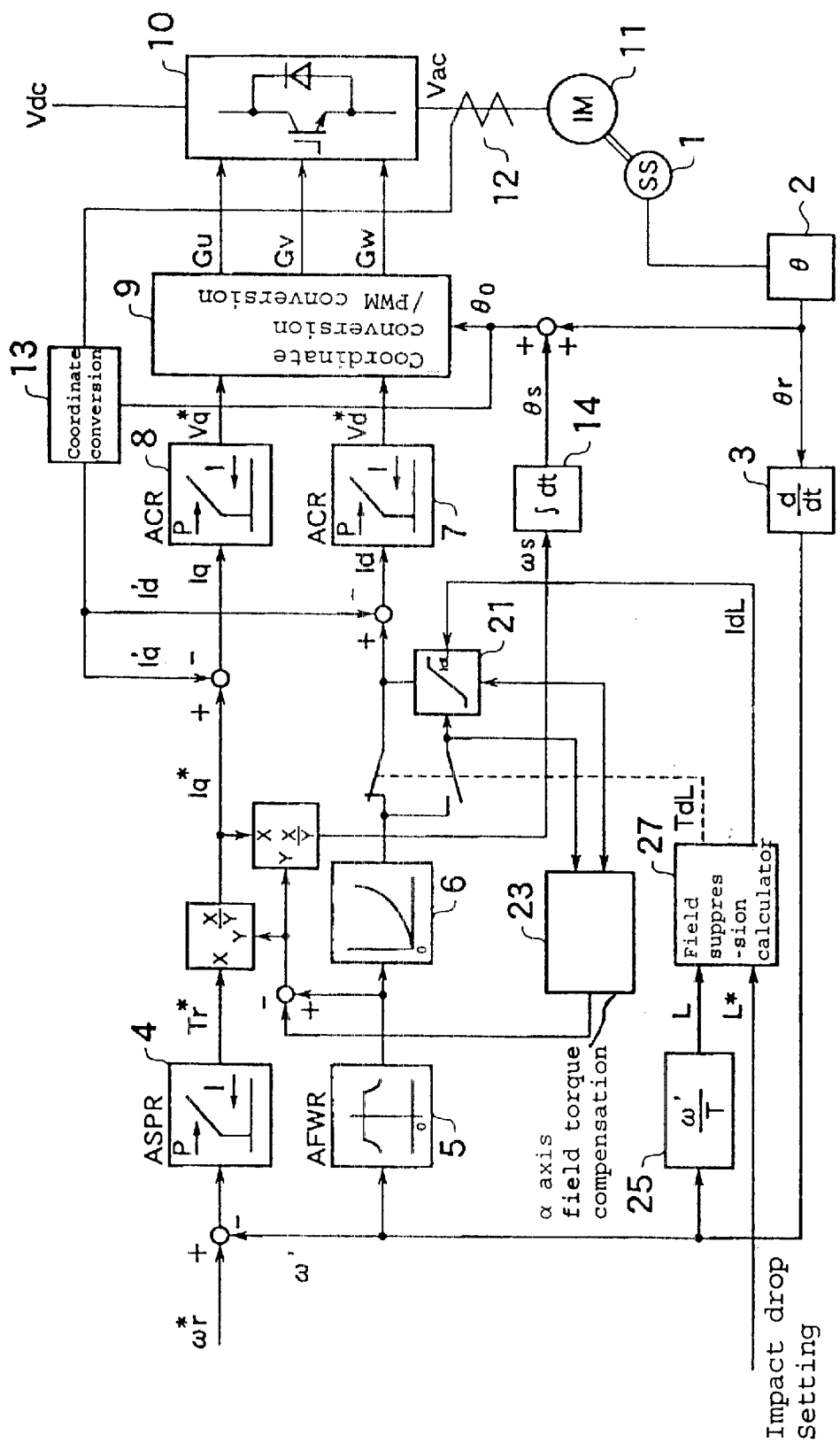
FIG. 9 is a block diagram of a motor control device according to a fifth embodiment of the present invention.

Next, a motor control device according to a fifth embodiment of the present invention is described with reference to FIG. 9. In the fifth embodiment, a field suppression calculator 27 is provided as the load condition evaluator 22. This field suppression calculator 27 inputs the speed feedback signal change amount L per unit time from speed converter 25 and, if the speed feedback signal change amount L exceeds the speed change amount reference level L* per unit time set beforehand as impact drop detection level, calculates dynamically or linearly a voltage suppression period Tdl proportional to this impact drop amount, and a voltage suppression level IdL and effects a selection such that the d axis field current Id is passed through d axis field current limiter 21, thereby suppressing the d axis field current Id to the voltage suppression level IdL exclusively during field suppression period Tdl.

Thus, by suppressing the d axis field current by the voltage suppression level IdL exclusively during the voltage suppression period Tdl, as in the embodiments described above, an armature voltage margin corresponding to the amount of impact drop can be conferred, thereby enabling recovery from impact drop to be achieved more roar, rapidly and without waste.

It should be noted that the system described above in which recovery from impact drop is achieved rapidly by providing a voltage change range (degree of margin) could also be applied to other control systems such as a cyclo converter system, two-level inverter system or NPC type three-level inverter system.

As described above, with the embodiments of the present invention, when impact drop due to steep change of load occurs, the drop in motor speed produced by the impact drop can be rapidly recovered by improving the rise of the motor current.

Furthermore, specifically, with the embodiments of the present invention, the d axis field current limiting means (unit) can suppress the d axis field current to a low value and so suppress the motor voltage by a prescribed amount to a lower level for a prescribed time, by suppressing the field pattern by shifting it to a low level when the aforesaid load condition evaluating means (unit) identifies steep change of load.

Specifically, when impact drop occurs, the d axis field current Id is calculated by a prescribed field weakening pattern from the speed feedback signal $\omega'$, but this entire field weakening pattern is shifted to a lower level by a certain desired feedback, thereby suppressing the d axis field current to low level; simultaneously, the q axis torque current Iq is increased to effect compensation in order to maintain the motor torque; the motor armature voltage Eac is thereby suppressed to a low level for a desired time; this improves the current rise (di/dt) by providing a voltage difference (voltage margin) between the converter output and the motor and so makes possible rapid recovery of motor speed immediately after impact drop.

Furthermore, specifically, it should be noted that, in accordance with an embodiment of the present invention, the load condition evaluation means (unit) identifies the load condition using a load signal that is input from an external load relay.

That is to say, it is possible to speed up motor speed recovery by providing a potential difference (voltage margin) between the converter output and the motor, by suppressing the d axis field current on identifying occurrence of impact drop by means (unit) of a signal from an external load relay.

Furthermore, specifically, it should be noted that, in accordance with an embodiment of the present invention, the load condition evaluation means (unit) identifies the load, condition from the amount of change of motor speed.

Specifically, by converting the speed feedback signal of the motor to a speed change amount in a certain unit time and identifying impact drop if this amount of change is larger than a speed change amount reference chat is arbitrarily set beforehand, armature voltage suppression is performed for an extremely short time in comparison with the time required for speeding up of the motor, so motor speed recovery from impact drop can be achieved rapidly thanks to a voltage margin of the motor armature current.

Furthermore, specifically, according to an embodiment of the present invention, the load condition evaluation means (unit) identifies whether or not there is a steep change in load from the magnitude of the q axis torque current calculated in this device and a previously set internal impact drop reference amount.

Specifically, by converting the torque reference signal calculated in a vector control step into a torque current change amount in a certain unit time and identifying impact drop as being when this amount of change is larger than a previously arbitrarily set amount of change reference corresponding to impact drop, motor voltage suppression is executed for an extremely short time, thereby producing a voltage margin of the motor armature voltage obtained, as a result of which motor speed recovery from impact drop can be achieved rapidly.

Furthermore, specifically, according to an embodiment of the present invention, the period TdL for which the d axis field current and hence the motor voltage is suppressed to a low level and the d axis field current suppression level IdL are determined using a speed feedback signal change amount per certain unit time.

Specifically, the d axis field current limiting means (unit) calculates the period TdL in which the d axis field current Id is suppressed to a low level and the d axis field current limiting amount during this period in accordance with the amount of change of motor speed per unit time, and changes these dynamically and linearly in accordance with the amount of impact drop.

In this embodiment, by changing dynamically and linearly the period TdL for which the d axis field current Id and hence the motor armature voltage Eac are suppressed to low level and the d axis field current suppression level IdL in accordance with the speed feedback signal change amount per certain unit time, a voltage difference is produced between the converter output and the motor, thereby making possible smooth and rapid compensation responsive to the amount of impact drop, by conferring a voltage margin of a prescribed period and magnitude.

Furthermore, specifically, according to an embodiment of the present invention, the invention can be applied to the vector control system of a cyclo converter, two-level inverter or NPC type three-level inverter.

That is to say, impact drop compensation obtained by a d axis field current control can also be applied to vector control systems of cyclo converters, two-level inverters or NPC type three-level inverters.

Obviously, numerous additional modifications and variations of the present invention are possible in light of the above teachings. It is therefore to be understood that within the scope of the appended claims, the present invention may be practiced otherwise than as specially described herein.

What is claimed is:

1. A motor control device with a vector control function, that inputs a speed reference signal from an external plant control device and that outputs a desired AC voltage and frequency in accordance with said speed reference signal, comprising:

a load condition evaluation unit that identifies a load condition of said motor from load information input from said external plant control device;

a d axis field current limiting unit that limits a d axis field current to a certain limiting amount when said load condition evaluation unit identifies that a load change is steep; and a d axis field torque compensation unit that compensates insufficiency of a motor torque produced by suppression of a d axis field current by said d axis field current limiting unit by increasing a q axis torque current.

2. The motor control device with a vector control function according to claim 1, wherein, when said load condition evaluation unit identifies that a load change is steep, said d axis field current limiting unit suppresses a d axis field current to a low level and hence suppresses a motor voltage to a low level for a prescribed time by a prescribed amount by suppressing a field pattern and by shifting said field pattern to a low level.

3. The motor control device with a vector control function according to claim 1, wherein said load condition evaluation unit identifies a load condition using a load signal that is input from an external load relay.

4. The motor control device with a vector control function according to claim 1, wherein said load condition evaluation unit identifies a load condition from an amount of change of said motor speed.

5. The motor control device with a vector control function according to claim 1, wherein said load condition evaluation unit ascertains whether a load change is steep or not from a magnitude of a q axis torque current calculated within said motor control device and a pre-set internal impact drop reference amount.

6. The motor control device with a vector control function according to claim 1, wherein said d axis field current limiting unit calculates a period for which said d axis field current is suppressed to a low level and a limiting amount of said d axis field current when said calculation is done in accordance with an amount of change of a motor speed per unit time, and changes said period and said limiting amount dynamically and linearly in accordance with an impact drop amount.

7. The motor control device with a vector control function according to claim 1, wherein said motor control is applied to a cyclo converter, two-level inverter or NPC type three-level inverter vector control system.

* * * * *